United States Patent Office 3,510,410
Patented May 5, 1970

3,510,410
PRODUCTION OF ELECTROLYTIC CONDENSERS
Harry Pierre Rosenthal, Mailand Via Guseppe Frua 15, Milan, Italy, and Viktor Degenhart, Cologne, Germany (Klingsorstr. 10/43, Munich 61, Germany)
Filed July 5, 1966, Ser. No. 562,753
Claims priority, application Germany, July 16, 1965, B 82,863
Int. Cl. C23b 5/58; B01k 3/00
U.S. Cl. 204—28                    13 Claims

ABSTRACT OF THE DISCLOSURE

A method of forming electrodes for electrolytic condensers, comprising the steps of continuously forming, electrolytically by a forming voltage, a forming layer on roughened aluminum foil strips in a forming apparatus including at least one electrolytic bath, reducing during a second half of the forming period the voltage over the previously produced forming layer, for a short period of time, to a fraction of the forming voltage, gradually increasing the voltage again, so that an additional forming current is produced, and continuing the forming until a desired residual current is obtained.

---

Figure 1:
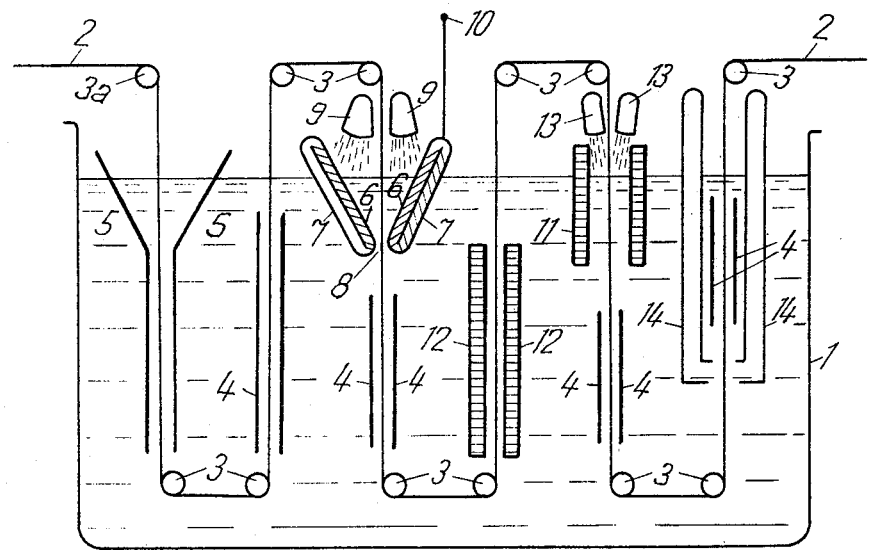

This invention relates to a method of forming electrodes for electrolytic condensers, more particularly for continuous forming of roughened aluminium foil strips. The object of the invention is to produce a stable formed layer.

For the production of a stable oxide layer, a continuous method of forming roughened aluminium foil provided with a boehmite layer is known in which the foil is withdrawn from the forming bath for a short time during the first third of the forming, for the purpose of degassing or intermediate drying.

In another known method of this kind, the foil strip is likewise withdrawn from the forming bath at least once during the forming process and is then led back into the bath by a depolarising electrode. This depolarising electrode is operated with voltage pulses and serves the purpose of removing, by impulse discharge, ions which have formed on the dielectric skin of the foil and obstruct the progress of the forming.

The complete forming of the electrode before making the coil becomes constantly more important owing to the tendancy to make electrolytic condensers smaller and smaller. While with the large dimensions which were formerly customary, a subsequent forming in the condenser or in the coil, involving a substantial energy conversion, was quite feasible, at the present time such subsequent forming may lead to destruction of the condenser or of the coil.

The present invention relates to a method of forming electrodes for electrolytic condensers, more particularly for continuous forming of roughened aluminium foil strips in a forming apparatus comprising one or more baths, and has for its object to prevent a foil from leaving the forming apparatus in an incompletely formed state, even if a small residual current has been reached at a given forming voltage.

According to the invention, during the second half of the forming period, the voltage over the forming layer already produced is reduced for a short period to a fraction of the forming voltage and is then gradually increased again, so that with a foil of the above mentioned type and additional forming current is produced and the forming is continued until the desired residual current is reached. It is to be noted that the voltage over the forming layer and the forming voltage are assumed to be positive voltages.

In experiments with a standing forming bath, it has been found that an aluminium foil formed with a given forming voltage up to the point when a small residual forming current is reached, i.e. an apparently completely formed foil, may show the following behaviour: If the foil is left in the bath after the voltage has been cut off, and immediately or after a period in which a discharging of the foil can occur with certainty, e.g. after 1 minute, the forming voltage is suddenly applied, then after the capacitative charge has been dissipated the residual current returns instantaneously to the previously observed value. If however after the foil has ben discharge the voltage is increased gradually, i.e. within one minute, the foil unexpectedly takes up suddenly a current far exceeding the residual current at a certain voltage which is a fraction of the forming voltage and is referred to below as starting voltage, that is the apparently fully formed foil begins an additional forming at a voltage below the forming voltage. After the forming voltage and the residual current have again been reached, which may involve a Coulomb demand of 10% of the total forming consumption, the foil is in all cases found to be completely formed. It is immaterial whether the foil is coated with boehmite or uncoated, roughened or smooth.

In the experiments described above, the voltage was reduced to zero and raised again slowly, so that the starting voltage for the additional forming was reached with certainty. In order to save time it is naturally preferable to reduce the voltage only slightly below the starting voltage. The value of the starting voltage depends upon the type of foil and the forming conditions such as composition and specific resistance of the electrolyte, bath temperature and speed of forming, and is determined experimentally. In general it is 10–30% of the forming voltage. The time required for the voltage reduction and the rate at which the voltage is raised again, likewise depend on the conditions mentioned. The times referred to in the description of the experiments can however as a rule be considerably reduced, namely down to a few seconds.

When the additional forming has once started it is immaterial how quickly the voltage is further increased. Thus during the above mentioned increasing the voltage can be raised suddenly from a value somewhat above the starting voltage up to the forming voltage which results in an acceleration of the forming operation.

For the initiation of the additional forming according to the invention, it is by no means necessary that the foil should already have been formed down to a small residual current, for example 1 ma./cm.², but rather the additional forming can be started at a time at which the residual current is of a higher order.

The effect whereby a foil simulates the state of complete forming can also occur in the above mentioned method. By a modification of the process according to the invention however this error can be avoided with certainty.

If in the first mentioned known method the degassing or intermediate drying is carried out in the second half of the forming period, by means of a forming voltage and/or an electrolyte of high internal resistance and/or by a suitable electrode arrangement the result can be obtained that the voltage over the forming layer on re-insertion in the bath lies below the starting voltage and during the further movement of the foil rises slowly up to the forming voltage so that the condition for the additional forming is fulfilled.

In the second known method, the invention can be carried out with the same means and also by arranging that the depolarisation electrode is operated with voltage pulses such that the voltage over the forming layer drops steeply and then gradually increases and passes through the starting voltage value during its increase.

Embodiments of the invention are described in detail with reference to FIGS. 1 to 3 of the accompanying drawing.

Figure 2A:
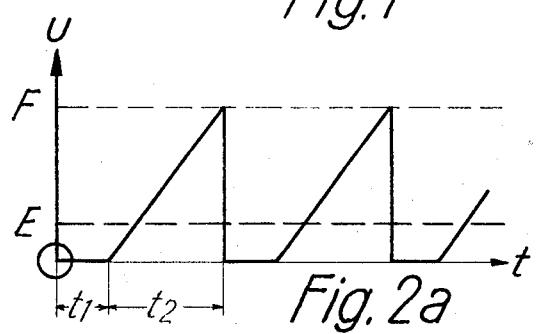

FIG. 1 shows in section a normal forming bath 1, in which an aluminium strip 2 guided by rollers 3 travels past the forming electrodes 4, the direction of movement of the strip being shown by the arrows. The electrodes 4 are earthed and the aluminium strip 2 is supplied with the forming voltage by the contact roller 3a.

For the sake of simplicity the devices according to the invention or to be operated according to the invention 5, 6, 11, 12, 13 and 14 are shown together in FIG. 1. For carrying out the invention in each case the use of one of these devices is sufficient and this is to be provided within the bath 1 in the second half of the path of the strip.

With the device 5 in FIG. 1 the forming electrodes are enlarged in funnel shape so that, if necessary making use of a high internal resistance of the electrolyte, the voltage over the forming layer already produced is reduced below the value corresponding to the starting voltage as the foil is re-introduced into the bath, the capacity and the residual current of the foil reached at this moment also having their effect. The use of a funnel-like enlargement of the forming electrode is already known in itself as is the reduction of the initial current in forming.

The device 6 in FIG. 1 is hitherto known as a depolarisation electrode, the operation and effect of which have been described above and its construction is described with reference to FIG. 1. The electrode 6 is surrounded by an insulating jacket 7 so that no direct current can flow between it and the electrode 4. To suppress the parasitic ion current forming liquid is constantly supplied to the electrode through the pipes so that a flow towards the opening 8 is produced. The electrode is supplied with its pulsed operating voltage by the conductor 10. For carrying out the invention this operating voltage is made such that the difference voltage between it and the forming voltage supplied to the aluminium strip, that is practically the voltage existing over the forming layer already produced varies with respect to time in manner illustrated in FIGS. 2a and 2b.

In the figures F is the forming voltage and E the starting voltage. In FIG. 2 the voltage U over the forming layer during one period first falls steeply to zero and after a time $t1$ rises again slowly up to the forming voltage. This operation is repeated at one part of the aluminium strip until the strip has left the electrode 6 after which the foil is fully formed.

Figure 2B:
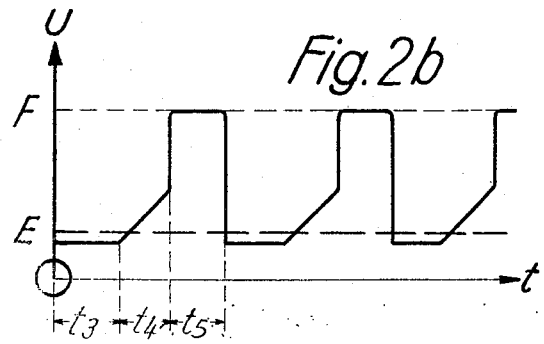
Figure 3:
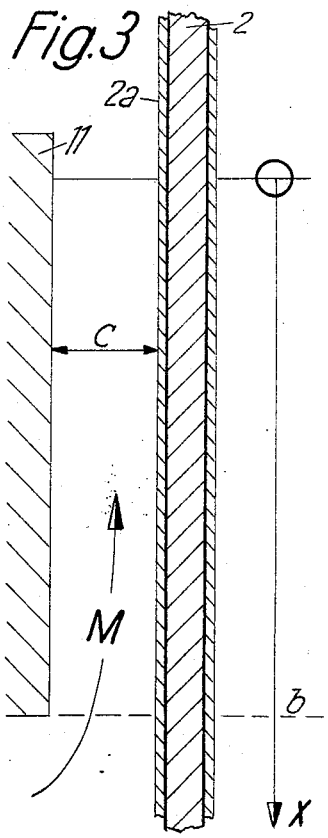

FIG. 2b corresponds to a voltage characteristic in which the voltage over the forming layer falls only to a value lying slightly under the starting voltage and after slowly rising to a value above the starting voltage is suddenly raised up to the forming voltage. The times given in FIGS. 2a and 2b may, for example have the following values: $t1=10$ seconds, $t2=20$ seconds and $t3=t4=t5=10$ seconds.

A further possibility for carrying out the invention by means of the electrode 6 is obtained when a fixed voltage is applied to the electrode so that the voltage over the forming layer within the electrode lies somewhat below the starting voltage. The necessary voltage increase over the forming layer is then obtained by the passage of the foil through the opening 8.

A particularly simple and advantageous form of the invention is obtained if the aluminium strip is screened over a given distance by the provision of pairs of insulating plates 11 or 12 in FIG. 1 parallel to the strip. In some cases it is necessary to make the pair of plates into a box open at top and bottom by means of narrow insulating strips. Then the forming voltage can be applied to the screened part of the foil only through the narrow passage between the insulating plates and the foil, and by suitable choice of the spacing between the insulating plates and the foil, and by use of an electrolyte of normal or high resistance a voltage drop can be obtained such that the voltage over the forming layer drops below the starting voltage and the additional forming is initiated. The voltage over the forming layer with the pair of plates 11 is immersed at one end at the liquid surface and the pair of plates 12 arranged entirely in the bath reaches its minimum in the middle between the entry and the exit of the foil and approaches the forming voltage at the re-entry of the foil into the unscreened bath.

It will be obvious that by suitable shaping of the plates the spacing of the plates and the course of the voltage in the direction of movement of the foil can be varied more particularly nozzle like constrictions which preferably may be made of a resilient or yielding material such as rubber or soft plastic, provided at the entry and exit of the foil may be advantageous.

A calculation shows how great the plate spacing and the length of the screening must be for a given forming state of the foil in order to produce a desired minimum voltage over the forming layer. FIG. 3 shows the insulating screening 11 of length $b$ and the foil 2, spaced at a distance $c$, with the forming layer 2a. Assuming that the resistance of the forming layer is substantially greater than the resistance of a column of forming liquid of height C, the calculation can be carried out in a linear manner. For this purpose an $x$-axis in the direction of movement of the foil with an origin at the bath surface is assumed. J indicates the current flowing in the forming liquid column of cross section $c$ multiplied by 1 cm. oppositely to the $x$-direction, U is the voltage over the forming layer 2a, F is the forming voltage, $\alpha$ is the specific resistance of the electrolyte and $\beta$ is the resistance of the forming layer per square centimetre surface. The differential equations $$dU = \frac{\alpha}{c} J dx \text{ and } dJ = \frac{U}{\beta} dx$$

are obtained, the solution of which under the limiting conditions $U=F$ for $x=b$ and $J=0$ for $x=0$ lead to $$U = F \frac{e^{\gamma x} + e^{-\gamma x}}{e^{\gamma b} + e^{-\gamma b}} \text{ where } \gamma = \sqrt{\frac{\alpha}{c\beta}}$$

An example is worked out from the formula for the voltage over the forming layer when $x=0$, $$Uo = F \frac{2}{e^{\gamma b} + e^{-\gamma b}}$$

For $\beta=80,000$ ohms—this corresponds to a forming to a residual current of 5 ma./cm.² at 400 volts, $\alpha=1000$ ohms cm. and $c=1$ cm., we obtain $Uo=0.21$ F at $b=20$ cm. and $Uo=0.07$ F at $b=30$ cm. Thus if the starting voltage is 30% or 10% of the forming voltage, a screening of a length of 20 cm. or 30 cm. suffices with an adequate safety factor. This safety factor is in practice even greater because the calculation was carried out without considering the additional forming current which has the tendency to reduce the voltage. For the pair of plates 12 in FIG. 1 which is completely immersed in the bath the length calculated above with other conditions remaining the same is to be doubled.

The effect of the screening 11 in FIG. 1 can be increased if forming liquid is constantly pumped between the insulating plates and the foil through the pipes 13 so that the resistance for the forming current is increased and the voltage over the forming layer on re-immersion of the foil is still further reduced.

If the pipes 13 are made in the form of suitable nozzles which extend over the whole breadth of the aluminium strip and preferably lie below the level of the liquid, the forming layer can be made free from current even without screening by the newly supplied liquid current. On further movement of the foil there is a slow rise in the voltage over the forming layer.

Such slit-like nozzles can be provided also at any desired point within the second half of the forming operation as shown at 14 in FIG. 1.

It is also possible, without supplying fresh forming liquid, simply by movement of the electrolyte, to divert the forming current from the foil and so produce the desired voltage drop.

What we claim is:

1. A method of forming electrodes for electrolytic condensers, comprising the steps of
    continuously forming electrolytically by a forming voltage, a forming layer on roughened aluminum foil strips in a forming apparatus comprising at least one electrolytic bath,
    reducing during a second half of the forming period the voltage over the previously produced forming layer, for a short period of time, to a fraction of the forming voltage,
    gradually increasing the voltage again, so that an additional forming current is produced, and
    continuing the forming constituting an additional forming until a desired residual current is reached.

2. The method, as set forth in claim 1, further comprising the step of
    rapidly increasing the voltage over the forming layer to the forming voltage after the initiation of the additional forming current.

3. The method, as set forth in claim 1, wherein the reduction of the voltage over the forming layer is effected by withdrawing the foil from the electrolytic bath or by intermediate drying of the foil.

4. The method, as set forth in claim 1 wherein the reduction and/or the gradual increase of the voltage over the forming layer is effected by means of a forming voltage source and/or an electrolyte with high internal resistance and/or an electrode arrangement, and/or the charging current of the foil capacity.

5. The method, as set forth in claim 1, further comprising the step of
    increasing the voltage over the forming layer to the forming layer by orienting electrodes at distance from the foil which diminish in the direction of movement of the foil.

6. The method, as set forth in claim 1 further comprising the step of
    maintaining an electrode at a suitable potential surrounded by an insulating jacket and communicating with the electrolytic bath through a narrow opening.

7. The method, as set forth in claim 6 further comprising the step of
    applying voltage pulses to the electrodes.

8. The method, as set forth in claim 1 further comprising the step of
    providing a separate bath with an electrode at a suitable potential for the additional forming.

9. The method, as set forth in claim 8 further comprising the step of
    applying voltage pulses to the electrodes.

10. The method, as set forth in claim 1, further comprising the step of
    screening the foil during a part of its path through the electrolytic bath.

11. The method, as set forth in claim 10, further comprising the step of
    providing resilient boxes with nozzle-like constrictions at open narrow ends thereof to effect the screening step.

12. The method, as set forth in claim 1, wherein the voltage over the forming layer of the foil is reduced with the assistance of currents of the electrolytic bath.

13. The method, as set forth in claim 12, further comprising the step of
    flowing fresh forming liquid adjacent the foil.

References Cited

UNITED STATES PATENTS

| | | | |
|---|---|---|---|
| 2,057,315 | 10/1936 | Robinson | 204—35 |
| 2,494,954 | 1/1950 | Mason et al. | 204—28 |
| 2,828,250 | 3/1958 | Hurd | 204—28 |
| 2,951,025 | 8/1960 | Mostovych et al. | 204—28 |
| 3,074,857 | 1/1963 | Altenpohl | 204—28 |
| 3,079,308 | 2/1963 | Ramirez et al. | 204—28 |
| 3,120,695 | 2/1964 | Burnham | 204—35 |
| 3,296,114 | 1/1967 | Lloyd | 204—28 |

FOREIGN PATENTS

| | | |
|---|---|---|
| 761,196 | 11/1956 | Great Britain. |
| 587,445 | 11/1933 | Germany. |

JOHN H. MACK, Primary Examiner

T. TUFARIELLO, Assistant Examiner

U.S. Cl. X.R.

204—211